March 18, 1969  J. F. SHARKEY ET AL  3,433,203

REFLECTIVE INDICATOR DEVICE

Filed Aug. 3, 1966

INVENTORS
JOHN F. SHARKEY
RAYMOND E. LA VOIE, JR.

BY

ATTORNEY

United States Patent Office 3,433,203
Patented Mar. 18, 1969

3,433,203
REFLECTIVE INDICATOR DEVICE
John F. Sharkey 350 Fellows Ave., Syracuse, N.Y. 13210, and Raymond E. Lavoie, Jr., County Home Road, Mexico, N.Y. 13114
Filed Aug. 3, 1966, Ser. No. 570,001
U.S. Cl. 116—28        4 Claims
Int. Cl. B60q 1/26

ABSTRACT OF THE DISCLOSURE

Marking device comprising a sphere of Styrofoam or the like with a heat formed compacted wall radial aperture, in which one end of a section of resilient rubber tubing is inserted, the other end being provided with an external ring clamp for contracting the tube about a support rod, and a sealing and reflective coating for the sphere.

---

This invention relates to inexpensive marking or warning devices for use on motor vehicles, or along highways, driveways or runways and the like.

Motor vehicles have been streamlined to such an extent that two vehicles approaching intersection along the intersecting highways may be hidden from one another until practically upon the intersection. Intersections not formerly considered blind, become blind due to decrease in vehicle height. The situation is especially hazardous in territories subject to heavy snow accumulation, since in plowing the highways, snowbanks along the highway are created of a height greater than the vehicles thus creating blind intersections. In situations of this sort, vehicles simultaneously approaching an intersection along intersecting highways are rendered invisible to one another, until the intersection has been reached. In such territories, a parked low streamlined vehicle, culverts, and other obstructions may be buried in snow so as to be invisible to and become a menace to an approaching snow plow. Also, driveways, bridge culverts and obstructions may be so hidden by snow drifts, so as to render it difficult to locate the actual roadways for plowing.

The present invention is directed to an inexpensive warning or marking device that may be readily applied to the end of an elevated motor vehicle antenna, or upon rods which may be driven in the ground to form elevated markers. The device is preferably of spherical form and made of light weight cellular plastic such as Styrofoam and provided with mounting means. The cellular plastic is surface treated to provide a base for reflective paint so that the devices will stand out in both daylight, or in the dark when subjected to light rays, either from a beam or the stray light thereof.

The device, being substantially higher than the vehicle when employed on the end of a vehicle antenna, will provide an early warning to an approaching vehicle which may be hidden behind the crest of a hill.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIGURE 7 is an illustration of a series of devices aligned to indicate a driveway, runway, or the like.

Figure 1:
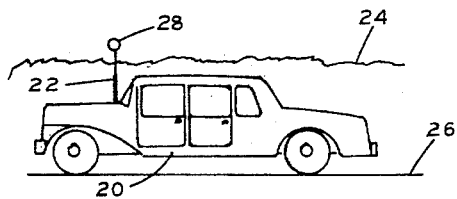
FIGURE 1 is a view of a motor vehicle provided with the device.
Figure 2:
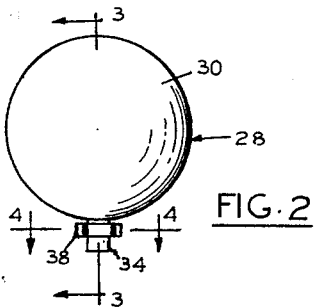
FIGURE 2 is a side elevational view of the device for attachment to a motor vehicle antenna.
Figure 4:
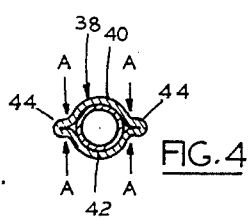
FIGURE 4 is a sectional view of FIGURE 2 taken on the line 4—4 thereof.
Figure 3:
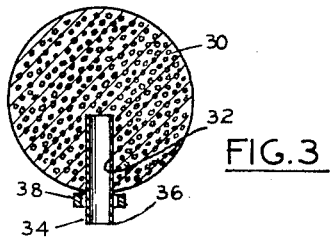
FIGURE 3 is a sectional view of FIGURE 2 taken on the line 3—3 thereof.

Referring to FIGURES 1-4, there is shown a vehicle 20 of the low streamlined type having a radio antenna 22, which when extended, rises to a height well above the vehicle roof and above a snow bank, for example, as indicated at 24 that skirts the edge of the highway 26. To the end of the antenna is applied a signalling device 28 according to the invention. The device more particularly comprises a spherical body portion 30 of Styrofoam or other lightweight porous material, and in practice may be of convenient size as about 3 inches in diameter. The spherical body portion is provided with a circular radial aperture 32, which may be formed as by a tool having an end approximately the diameter and depth of aperture desired, which tool can be heated above the fusion temperature of the Styrofoam and when pressed radially into the spherical ball of Styrofoam, forms the aperture desired while compacting the Styrofoam about the aperture to reinforce the aperture walls.

Figure 5:
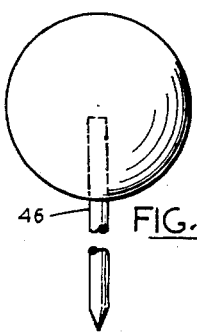
FIGURE 5 is a modified form of mounting for the device.

A short length of rubber tubing 34 of the diameter of the aperture may have one end inserted into the aperture, and secured or bonded therein by any weatherproof adhesive such as an epoxy cement. The free end 36 of the tubing may extend outwardly of the sphere a short distance and be provided with an external sleeve 38 which may be contracted by a contracting tool, about the end of antenna inserted into the tubing. The sleeve may be of deformable metal having arcuate portions 40 and 42 joined by deformable integral U shaped ears 44, pressure being applied to squeeze the ears by a tool applying pressure in the direction of arrows A.

Where such a device is to be applied to a rod 46, as in FIGURE 5, the rod end may be inserted into an aperture of a size commensurate with the rod end and the rod cemented therein with any suitable adhesive or epoxy cement as before.

Figure 6:
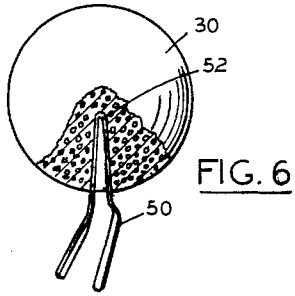
FIGURE 6 is a further modified form of attachment.

Such spheres are preferably given an unusual appearance, as will be described hereinafter and may be employed as ornaments and attached to tree branches and the like by employing, in place of the rod or tubing, a plastic coated wire tie 50, the doubled up end 52 of such tie being inserted into the aperture in the sphere and held therein by epoxy cement (see FIGURE 6).

Figure 8:
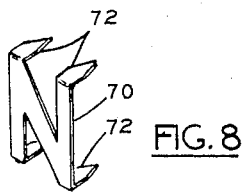
FIGURE 8 is a decorative indicia adapted to be applied to the surface of the device.

Since the Styrofoam material is highly cellular and presents a porous surface, the spherical balls are preferably dipped in a latex paint solution to provide a smooth outer surface which effectively seals up the pores. The outer surface as thus sealed, is thereafter sprayed with a reflective type paint. Such paint or the under coat may be of any color desired or of several colors. However, for a warning device for vehicle antenna use, the color red may be advantageous due to its superior tendency to attract attention and its recognized use in connection with danger signals. The reflective paint will be effective to cause the device to stand out in both daylight and at night, and at night the stray rays of any light beam will be effective for the purpose. If desired, initials, crests, Greek letters and the like may be applied to the exterior surface. In FIGURE 8, the letter N is shown at 70 with suitable points 72 for insertion into the soft exterior surface of the spheres. By color combinations, or use of suitable indicia, the markers may serve to identify a particular owner's car from other cars of like make and exterior appearance in a large parking lot. Such letters, or emblems may be secured to the surface by other suitable means such as pressure sensitive adhesive.

Figure 7:
Figure 7:
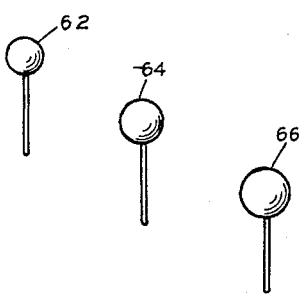

The devices, are adapted to mark off driveways, and when mounted sufficiently high, will assist one in guiding his vehicle in backing out of driveways, since the elevated back deck and trim side wings of many vehicles are such as to tend to obscure the exact location of a narrow driveway immediately to the rear of the vehicle. They may also be employed in a row at suitably spaced intervals along the side of a highway, or along an aircraft runway. By graduating the size of the spheres, as indicated in FIGURE 7, from a small sphere as at 60 of about 4 inches diameter, to gradually larger spheres as at 62, 64, and 66, illumination from a single light source 68 suitably disposed to embrace all the spheres within its slightly divergent beam as indicated, may provide an illumination of all spheres and give an effect of uniform illumination. If desired, phosphorescent paint may be employed, which will result in self-illumination.

While many further uses for the device will occur to those skilled in the art, it will be understood that the lightness of the material and its low cost in combination with the ability to provide a firmly attached supporting means, and to provide the reflective surface, results in a practical device for promoting safety and giving warning.

While a single embodiment with variations of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. An indicating device comprising a substantially spherical body member of light cellular inorganic material said body member having a substantially radial bore having a compacted wall heat formed therein and extending approximately to the center of said body member, a resilient tubular member disposed in said bore and bonded therein and having a free end portion extending outwardly beyond the surface of said body member, a clamping ring mounted on said free end portion, said body having an exterior sealing coating to seal off the porous surface of the cellular material and an outer exterior coating of reflective paint.

2. A device in accordance with claim 1 wherein the body member is formed of Styrofoam.

3. A device in accordance with claim 1 wherein the sealing coating is a latex paint.

4. A device in accordance with claim 1 wherein the body member is formed of Styrofoam, and the sealing coating is a latex paint.

References Cited

UNITED STATES PATENTS

| 2,657,379 | 10/1953 | Zappia | 340—366 |
| 2,704,839 | 3/1955 | Sweet | 240—100 XR |
| 2,706,462 | 4/1955 | Evans | 116—28 |
| 2,854,942 | 10/1958 | Ross | 116—28 |
| 3,128,140 | 4/1964 | Stephenson | 73—118 XR |
| 3,320,920 | 5/1967 | Lusebrink | 116—28 |

LOUIS J. CAPOZI, *Primary Examiner.*

U.S. Cl. X.R.

116—173